United States Patent [19]

Maeda et al.

[11] 4,094,385
[45] June 13, 1978

[54] LEVELLING APPARATUS FOR AC ELEVATOR

[75] Inventors: Yasuyuki Maeda; Nobuo Mitsui, both of Katsuta; Tadao Kameyama, Ibarakimachi; Katsu Komuro, Katsuta, all of Japan

[73] Assignee: Hitachi, Ltd., Japan

[21] Appl. No.: 677,071

[22] Filed: Apr. 14, 1976

[30] Foreign Application Priority Data

Apr. 21, 1975 Japan .................................. 50-47438

[51] Int. Cl.² ............................................... B66B 1/40
[52] U.S. Cl. ............................................... 187/29 R
[58] Field of Search ........................................ 187/29

[56] References Cited

U.S. PATENT DOCUMENTS

| | | | |
|---|---|---|---|
| 2,847,091 | 8/1958 | Santini et al. | 187/29 |
| 3,687,235 | 8/1972 | Mitsui et al. | 187/29 |
| 3,749,203 | 7/1973 | Hoelscher | 187/29 |
| 3,798,519 | 3/1974 | Habisohn | 187/29 X |
| 3,815,711 | 6/1974 | Hoelscher | 187/29 |

Primary Examiner—Robert K. Schaefer
Assistant Examiner—W. E. Duncanson, Jr.
Attorney, Agent, or Firm—Craig & Antonelli

[57] ABSTRACT

In an a-c elevator, an elevator car suspended by ropes is driven by an induction motor for vertical movement. A system commonly used for controlling the device including thyristors connected in parallel with opposite polarities across a three-phase a-c power source and the induction motor for controlling the motoring torque produced by the induction motor, a bridge rectifier including a thyristor for supplying direct current to the induction motor for controlling the braking torque produced by the induction motor, and means for controlling the operating phase of the thyristors in the thyristor device and the thyristor in the bridge rectifier depending on the error between the instructed speed and the actual speed of the elevator car. When the elevator car stops at a target floor and passengers get on and off the elevator car, the variation in the load of the elevator car results in an increase or decrease in the length of the ropes thereby giving rise to an error between the floor level of the target floor and that of the elevator car. A levelling apparatus is provided which comprises a position detector detecting this level error in either direction, and a level correction speed pattern signal generator generating a level correction speed pattern signal in response to the appearance of an output from the position detector, so that the operating phase of the thyristors in the thyristor device and the thyristor in the bridge rectifier can be controlled depending on the error between the level correction speed pattern and the actual speed of the elevator car.

33 Claims, 13 Drawing Figures

LEVELLING APPARATUS FOR AC ELEVATOR

This invention relates to an improved levelling apparatus for a-c elevators in which elevator cars are driven by induction motors.

In an elevator system, an elevator car and a counterweight are generally carried at opposite ends of a rope trained around a sheave driven by an electric motor so that the elevator car can be driven in the vertical direction of a building to serve the service floor landings of the building. A rope of great length is required in a building having many floors. In such a case, ropes of greater length are subject to more extension and contraction than those of shorter length depending on the load of the elevator car. Thus, even when the elevator car stops accurately at the predetermined stop position of a target floor, the length of the rope is extended or contracted depending on the number of passengers getting off and on the elevator car, and the floor level of the elevator car is dislocated in either direction from the floor level of the target floor resulting in an error which is called a level error hereinafter.

Means are provided so as to correct such error. In a d-c elevator system in which an elevator car is driven by a d-c motor, a method is commonly known according to which the direction of the level error is detected to drive the d-c motor in the direction for correcting this level error. According to another known method used in the d-c elevator system, the normal running speed pattern for the elevator car is changed to a level correction speed pattern when the car is about to arrive at the level of a target floor so as to correct the level.

On the other hand, in the case of an a-c elevator system utilizing an induction motor for driving an elevator car, it is difficult for the motor to produce a torque which changes continuously from a positive to a negative value unlike the d-c motor used in the d-c elevator system. Thus, it has been unable to correct the level with high precision in such system.

A known levelling apparatus employed heretofore for an a-c elevator comprises an induction motor, contactors, position detecting means, speed detecting means, timing means and an electromagnetic brake. When a level error is detected by the position detecting means, the contactors are turned on to apply power supply voltage to the induction motor, and the motor produces a motoring torque for driving the elevator car. The timing means detects a preset timing, or the speed detecting means detects an increase in the speed of the elevator car up to a preset level in order to prevent the increase in the speed of the elevator car up to the rated value. In response to the detection of the preset timing or speed setting, the contactors are turned off to disconnect the motor from the power source thereby stopping the generation of the motoring torque by the motor. Then, the electromagnetic brake generates a braking torque to reduce the speed of the elevator car to zero. When the elevator car fails to be brought to within the predetermined level zone in spite of a series of operations as above described, such a series of operations are repeated until the elevator car is accurately brought into the predetermined level zone.

However, such a prior art levelling apparatus has been defective in various aspects. In the first place, the elevator car is decelerated to forcedly stop irrespective of the physical position thereof when the preset timing is detected or the preset speed level is reached after the levelling operation is started. Therefore, a series of level correcting operations as above described must be repeated until the elevator car is accurately brought to the desired floor level. Secondly, the torque varies over an extremely wide range until the elevator car is exactly brought to stop at the desired floor level, and this imparts a very uncomfortable feeling to the passengers in the elevator car, due to the fact that the contactors and electromagnetic brake are used for driving and braking the motor which drives the elevator car. Thirdly, in the case of the method of reducing the speed of the elevator car by detecting the preset timing, the detected speed of the elevator car at that time is variable depending on the load condition, while in the case of the method of reducing the speed of the elevator car by detecting the preset speed level, the detected time at which the speed of the elevator car attains the preset speed level varies also depending on the load condition. Further, the delayed operation of the relatively slow acting electromagnetic brake provides another factor which makes difficult the desired level correction. Therefore, the moving distance of the elevator car in one levelling operation varies depending on the load condition thereby making it difficult to reliably attain the desired level correction.

It is therefore a primary object of the present invention to provide an improved levelling apparatus for an a-c elevator which is free from the prior art defects pointed out above and exhibits improved performance to attain reliably the desired levelling operation.

An elevator car in an a-c elevator system is driven by an induction motor, and means for controlling the motoring torque of the induction motor are generally provided. Thyristors are a typical example of the motoring torque control means, and a circuit consisting of the thyristors connected in parallel with polarities opposite to each other or a circuit consisting of a thyristor and a diode connected in parallel with polarities opposite to each other is generally connected to a line of selected phase extending between the induction motor and an a-c power source. Means for controlling the braking torque are generally provided for reducing the speed of the elevator car from a normal running speed. A typical example of such means is a d-c braking control unit or reverse phase braking control unit utilizing also a thyristor.

An important feature of the present invention resides in the fact that, in an a-c elevator provided with motoring and braking torque control means as above described, the level error of an elevator car is detected in either direction by level error detecting means, and the motoring and braking torque control means are controlled depending on the output of the level error detecting means. By virtue of the above arrangement, the levelling apparatus for the elevator car in the a-c elevator system can exhibit improved performance to attain reliably the desired levelling operation. Further, a very small number of additional parts are merely required in the present invention.

In accordance with the present invention, there is provided a levelling apparatus for an a-c elevator comprising an induction motor, a motoring torque control unit controlling the motoring torque produced by said motor, a braking torque control unit controlling the braking torque produced by said motor, and an elevator car driven for vertical movement by said motor through a rope, wherein the improvement comprises level error detecting means for detecting dislocation of the floor level of said elevator car in either direction from the floor level of a target floor during loading and unloading of passengers at this floor, and means for actuating said motoring torque control unit and said braking torque control unit in response to the appearance of an output from said level error detecting means thereby controlling the torque produced by said motor.

Other objects, features and advantages of the present invention will become apparent from the following detailed description taken in conjunction with the accompanying drawings, in which:

FIG. 6b shows output waveforms of the speed pattern generator PTN shown in FIG. 6a;

Figure 1:
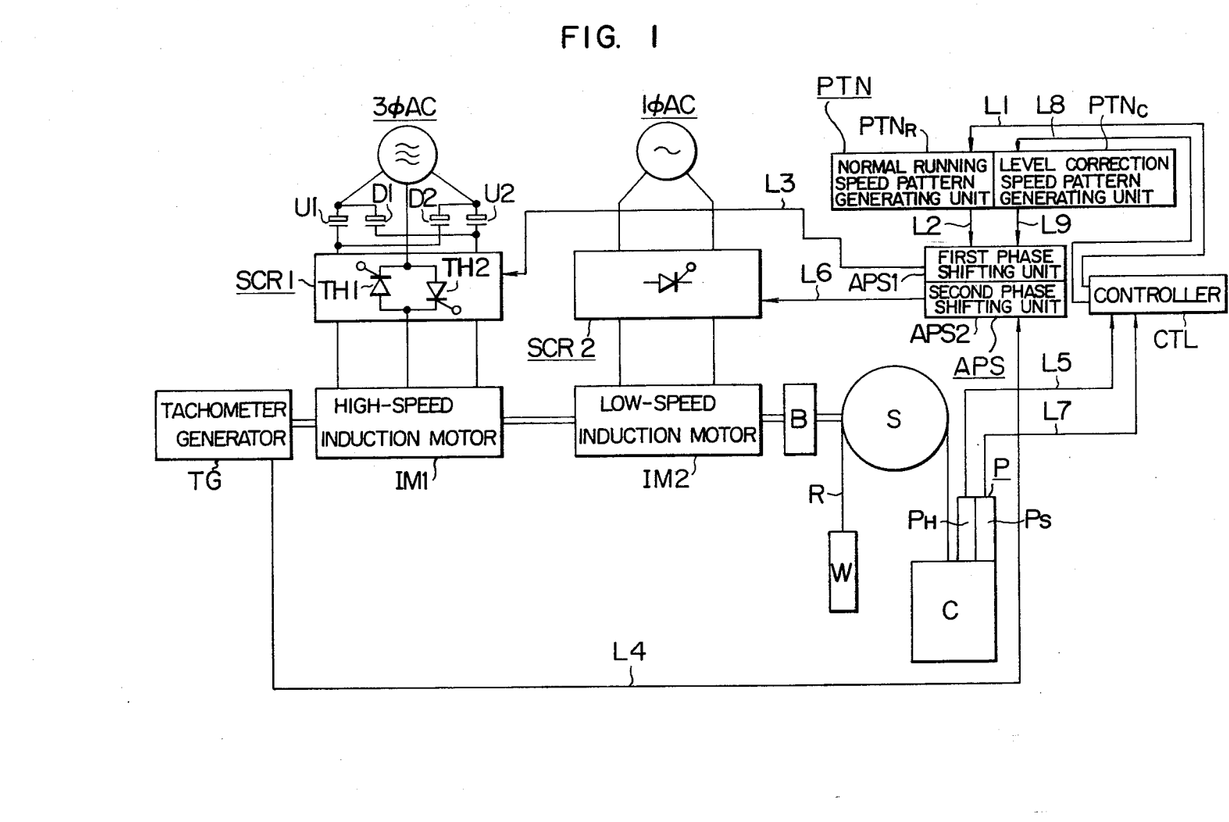
FIG. 1 is a diagrammatic view showing the structure of an a-c elevator equipped with an embodiment of the levelling apparatus according to the present invention.

A preferred embodiment of present invention will be described with reference to FIG. 1. Referring to FIG. 1, an induction motor comprises a high-speed motor $IM_1$ having a small number of poles and a low-speed motor $IM_2$ having a large number of poles. The high-speed motor $IM_1$ develops a torque used principally for starting and accelerating an elevator car C, and the low-speed motor $IM_2$ develops a torque used principally for decelerating the elevator car C. The low-speed motor $IM_2$ develops a braking torque under control of d-c braking current supplying means.

The high-speed motor $IM_1$ and the low-speed motor $IM_2$ are mechanically connected to each other and to a tachometer generator TG, a brake B and a sheave S. The elevator car C is connected to one end of a rope R, which is trained around the sheave S and is connected at the other end thereof to a counterweight W.

Suppose now that an elevator car operation controller CTL delivers a normal running speed operation instruction signal instructing upward (or downward) movement of the elevator car C. This instruction signal is applied by way of a line $L_1$ to a speed pattern generator PTN. This speed pattern generator PTN comprises a normal running speed pattern generating unit $PTN_R$ providing a normal running speed pattern and a level correction speed pattern generating unit $PTN_C$ providing a level correction speed pattern. The instruction signal is applied from the controller CTL to the normal running speed pattern generating unit $PTN_R$, and a normal running speed pattern signal is applied from the normal running speed pattern generating unit $PTN_R$ to a first phase shifting unit $APS_1$ in a phase shifter APS by way of a line $L_2$. In the meantime, contactors $U_1$ and $U_2$ for upward movement (or contactors $D_1$ and $D_2$ for downward movement) of the elevator car C are turned on under control of the controller CTL. The brake B is also deenergized under control of the controller CTL thereby releasing the force holding the induction motor in the stationary state. The first phase shifting unit $APS_1$ applies a gate signal by way of a line $L_3$ to a first thyristor device $SCR_1$ which operates as a motoring torque control means. This first thyristor device $SCR_1$ comprises a pair of thyristors $TH_1$ and $TH_2$ connected in parallel with polarities opposite to each other to one of three power supply lines connecting a three-phase a-c power source $3\phi$ AC to the high-speed motor $IM_1$ for supplying controlled three-phase alternating current to the motor $IM_1$.

In response to the application of the gate signal, the first thyristor device $SCR_1$ is turned on to supply the three-phase alternating current to the high-speed motor $IM_1$. The high-speed motor $IM_1$ starts to rotate in the normal (or reverse) direction by the torque produced by the three-phase alternating current, and the elevator car C starts to travel upward (or downward). The tachometer generator TG generates a speed signal proportional to the rotating speed of the high-speed motor $IM_1$, and this speed signal is applied to the first phase shifting unit $APS_1$ in the phase shifter APS by way of a line $L_4$. Thus, the first phase shifting unit $APS_1$ generates a gate signal giving a firing angle proportional to the difference ($V_S - V_P$) between the instructed speed pattern $V_S$ and the actual speed $V_P$. The operating phase of the first thyristor device $SCR_1$ is controlled by this gate signal so that the elevator car C can be driven at a normal running speed according to the speed pattern.

When the travelling elevator car C is brought to a position adjacent to the floor level of a target floor, a first position detecting unit $P_H$ in a position detector P is actuated to detect the position of the elevator car C travelling at the normal running speed and applied a position signal to the controller CTL by way of a line $L_5$. Therefore, the normal running speed pattern generating unit $PTN_R$ generates now a normal running speed pattern signal for reducing the speed of the elevator car C. As a result of the appearance of such speed pattern, the difference ($V_S - V_P$) between the instructed speed pattern $V_S$ and the actual speed $V_P$ is gradually reduced until finally this difference becomes zero, and the first thyristor device $SCR_1$ is turned off due to the gradual decrease of the firing angle.

On the other hand, a second phase shifting unit $APS_2$ in the phase shifter APS generates a gate signal giving a firing angle proportional to the difference ($V_P - V_S$) between the actual speed $V_P$ and the instructed speed pattern $V_S$. Thus, in response to the appearance of the speed pattern signal instructing the speed reduction, a gate signal giving a gradual increase in the firing angle is applied from the second phase shifting unit $APS_2$ by way of a line $L_6$ to a second thyristor device $SCR_2$ which operates as a braking torque control means. This second thyristor device $SCR_2$ comprises a rectifier circuit including a thyristor which is connected across an a-c power source such as a single-phase a-c power source $1\phi$ AC and the low-speed motor $IM_2$ for supplying direct current to the motor $IM_2$ by subjecting the alternating current to half-wave or full-wave rectification. In response to the application of the gate signal, the second thyristor device $SCR_2$ is turned on to supply the direct current to the low-speed motor $IM_2$. The motor $IM_2$ produces a d-c braking torque for reducing the speed of the elevator car C. As soon as the elevator car C arrives at the target floor, the first position detecting unit $P_H$ generates a stop signal. The normal running speed pattern signal disappears, and the second phase shifting unit $APS_2$ applies a suitable gate signal by way of the line $L_6$ to the second thyristor device $SCR_2$ so as to impart a braking force by which the rotation of the motor $IM_2$, hence, the travelling movement of the elevator car C can be immediately ceased. At the same time, the brake B is energized to hold the elevator car C at the stopped position.

The first thyristor device $SCR_1$ which acts as the motoring torque control means may be in the form of an annular series of thyristors as disclosed in U.S. Pat. No. 3,876,918 in lieu of the form shown in FIG. 1. The normal running speed operation of the elevator car C is substantially the same as that described in U.S. Pat. No. 3,876,918 cited above.

A level error may be produced between the floor level of the elevator car C and the floor level of the target floor due to the extension or contraction of the length of the rope suspending the elevator car C when the elevator car C stands still at the target floor with the door opened and passengers get off and on the elevator car C.

Suppose now that this level error exceeds a predetermined setting in either the up direction (or the down direction). This predetermined setting will be referred to hereinafter as a starting level of level correction speed operation. When the level error exceeds the starting level of level correction speed operation, a second position detecting unit $P_S$ provided to deal with the level correction speed operation of the elevator car C applies an up (or down) level error signal to the controller CTL by way of a line $L_7$. The controller CTL applies a level correction speed operation instruction signal by way of a line $L_8$ to the level correction speed pattern generating unit $PTN_C$ in the pattern generator PTN, and the level correction speed pattern generating unit $PTN_C$ applies a level correction speed pattern signal to the phase shifter APS by way of a line $L_9$.

As in the case of the normal running speed operation, the contactors $D_1$ and $D_2$ (or $U_1$ and $U_2$) are turned on under control of the controller CTL, and the brake B is also deenergized. The first phase shifting unit $APS_1$ in the phase shifter APS applies a gate signal to the first thyristor device $SCR_1$ to turn on the same. The motor $IM_1$ starts to rotate in the reverse (or normal) direction, and the elevator car C starts to travel downwards (or upwards). The tachometer generator TG applies a speed signal to the phase shifter APS which controls the operating phase of the first and second thyristor devices $SCR_1$ and $SCR_2$. Therefore, the elevator car C is driven according to the level correction speed pattern. In other words, when the speed of the elevator car C tends to become higher than the predetermined level correction speed setting, a gate signal proportional to the difference $(V_S - V_P)$ between the instructed speed pattern $V_S$ and the actual speed $V_P$ is applied to the first thyristor device $SCR_1$ from the first phase shifting unit $APS_1$. As a result, the firing angle is decreased to reduce the motoring torque produced by the motor $IM_1$. At the same time, a gate signal proportional to the difference $(V_P - V_S)$ between the actual speed $V_P$ and the instructed speed pattern $V_S$ is applied from the second phase shifting unit $APS_2$ to the second thyristor device $SCR_2$. As a result, the firing angle is increased to increase the braking torque produced by the motor $IM_2$. When, on the contrary, the speed of the elevator car C tends to become lower than the predetermined level correction speed setting, the firing angle given by the gate signal applied to the first thyristor device $SCR_1$ is increased to increase the motoring torque produced by the motor $IM_1$. At the same time, the firing angle given by the gate signal applied to the second thyristor device $SCR_2$ is decreased to reduce the braking torque produced by the motor $IM_2$. Thus, the elevator C is driven at the level correction speed setting at which a balance is established among the motoring torque produced by the motor $IM_1$, the braking torque produced by the motor $IM_2$, and the load torque imparted to the sheave of the sheave S.

When the level error of the elevator car C becomes less than another predetermined setting (referred to hereinafter as a level correction speed operation completion level), the second position detecting unit $P_S$ applies a normal level attainment signal to the controller CTL, and a signal for instructing deceleration and stopping of the elevator car C appears from the controller CTL. In response to the appearance of this signal, the level correction speed pattern signal generated by the level correction speed pattern generating unit $PTN_C$ starts to disappear. As a result, the motoring torque produced by the motor $IM_1$ is reduced to zero, while the braking torque produced by the motor $IM_2$ is increased. The elevator car C is stopped and held in the stationary state by the brake B which is energized, and this completes the level correction speed operation, of the elevator car C.

It will thus be seen that the level correction speed operation starts when the level error produced as a result of the variation in the load of the elevator car C due to getting-off and -on of passengers exceeds the level correction speed operation starting level, and this operation ceases when the level error is decreased to less than the level correction speed operation completion level. Such level correction speed operation is carried out only during the period of time in which the door of the elevator car C is held open, and the normal running speed operation is solely carried out after the door is closed.

There is no basic difference between the normal running speed operation and the level correction speed operation of the elevator car C except that the former operation is started in response to a call signal, while the latter operation is started in response to a level error signal. That is, the elevator car C is driven under speed feedback control according to the speed pattern signal generated by the speed pattern generator PTN in response to the position signal generated by the position detector P.

Figures 2A, 2B, 2C:
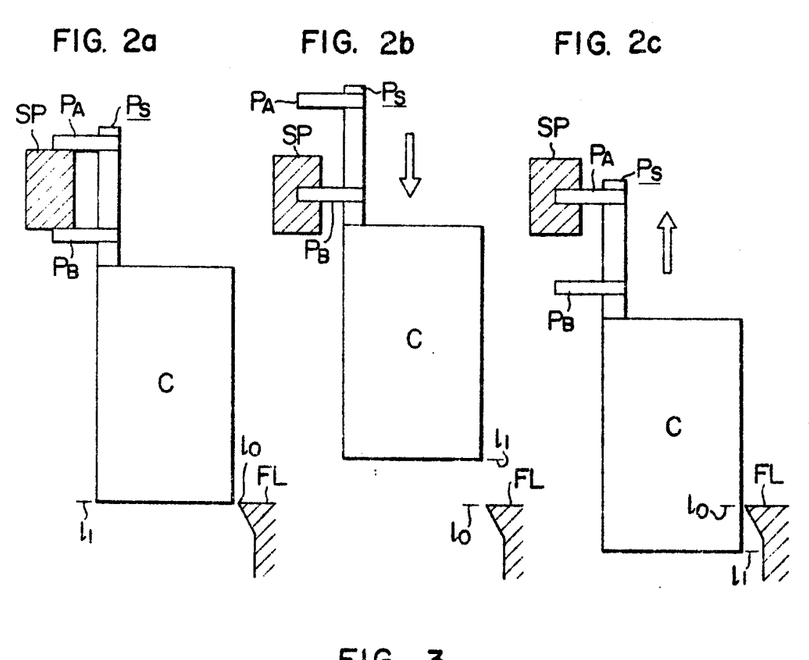
FIGS. 2a to 2c show schematically how the level error is detected by a position detector in the levelling apparatus.

FIGS. 2a to 2c illustrate the manner of level error detection by the position detector P when the door of the elevator car C is held open. FIG. 2a shows the state of the elevator car C when it is held stationary at a target floor after the normal running speed or level correction speed operation. In FIG. 2a, the floor level $l_1$ of the elevator car C registers with the level $l_0$ of the floor surface FL of the target floor, or the level error $|l_1 - l_0|$ is less than the level correction speed operation completion level. In this case, no output signal appears from the second position detecting unit $P_S$ and level correction speed operation is not started. The second position detecting units $P_S$ comprises a pair of vertically spaced position detecting elements $P_A$ and $P_B$ which are turned on and off depending on the position thereof relative to the position of a shielding plate SP disposed on the side of the building. In the case of FIG. 2a, both these position detecting elements $P_A$ and $P_B$ are turned on and no output signal appears from the second position detecting unit $P_S$.

FIG. 2b shows the case in which the floor level $l_1$ of the elevator car C is located above the level $l_0$ of the floor surface FL of the target floor, and the level error $|l_1 - l_0|$ exceeds the level correction speed operation starting level. In this case, the upper position detecting element $P_A$ is turned on, while the lower position detecting element $P_B$ is turned off, and the level error signal appears from the second position detecting unit $P_S$. This output signal is applied to the controller CTL by way of the line $L_7$ in FIG. 1, and the controller CTL applies the level correction speed operation instruction signal to the level correction speed pattern generating unit $PTN_C$ by way of the line $L_8$. Therefore, the level correction speed operation of elevator car C in the down direction is started in the manner described hereinbefore, and the elevator car C is brought approximately to the position shown in FIG. 2a. When the elevator car C is brought to stop at the position shown in FIG. 2a, the level error signal disappears.

FIG. 2c shows the case in which the floor level $l_1$ of the elevator car C is located beneath the level $l_0$ of the floor surface FL of the target floor, and the level error $|l_1 - l_0|$ exceeds the level correction speed operation starting level. In this case, the upper position detecting element $P_A$ is turned off, while the lower position detecting element $P_B$ is turned on, and the level error signal appears from the second position detecting unit $P_S$. Therefore, the level correction speed operation of the elevator car C in the up direction is started to bring the elevator car C to the position shown in FIG. 2a.

Figure 3:
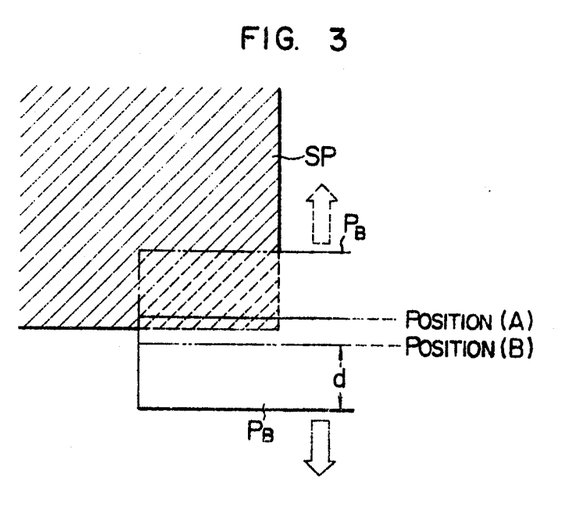
FIG. 3 shows schematically the level error detecting function of the position detector.

FIG. 3 shows the level error detecting function of the second position detecting unit $P_S$. The position detecting elements $P_A$ and $P_B$ of the second position detecting unit $P_S$ comprise a reed switch which is turned on or off depending on the position of the corresponding position detecting element relative to the position of the shielding plate SP. The lower position detecting element $P_B$, which is in the turnedoff state, is turned on at the position A in FIG. 3 when it moves away from the shielding plate SP, that is, in a direction as shown by the solid arrow. This position will be referred to hereinafter as an on point. On the other hand, the lower position detecting element $P_B$, which is in the turned-on state, is turned off at the position B in FIG. 3 when it moves toward the shielding plate SP, that is, in a direction as shown by the dotted arrow. This latter position will be referred to hereinafter as an off point.

The level error detecting function will be described with reference to FIG. 3. When the level error between the floor level of the elevator car C and the floor level of the target floor exceeds the starting level of the level correction speed operation in the down direction, the lower position detecting element $P_B$ is situated above the position B in FIG. 3 relative to the shielding plate SP. On the other hand, the level error between the floor level of the elevator car C and the floor level of the target floor is less than the level correction speed operation completion level, the lower position detecting element $P_B$ is situated beneath the position A in FIG. 3 relative to the shielding plate SP. Suppose now that the elevator car C stops at the level at which the lower position detecting element $P_B$ takes the position A in FIG. 3 and during that time, an up level error is produced due to a shift of this level in the up direction. Then, the level correction speed pattern generating unit $PTN_C$ delivers the level correction speed pattern signal so as to move the elevator car C in the down direction at the level correction speed. This level correction speed operation continues until the elevator car C is moved downward to the position A in FIG. 3. At this position A or on point, the lower position detecting element $P_B$ is turned on, and the level correction speed pattern signal disappears to stop the downward movement of the elevator car C. It will thus be seen that the position detecting unit has the hysteresis characteristic so that the desired levelling control can be reliably attained without repetition of upward and downward levelling movement of the elevator car C.

Figure 4:
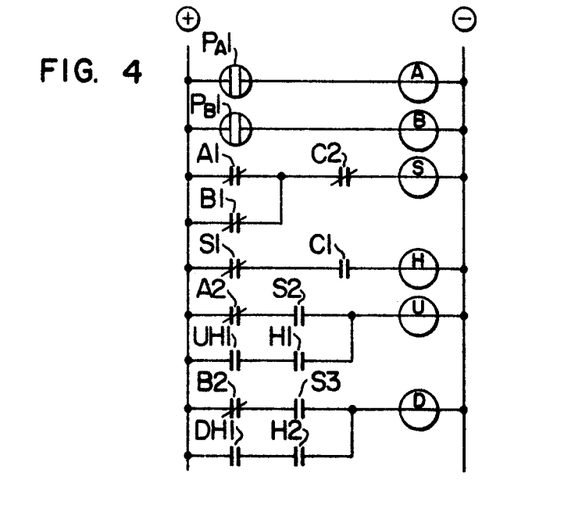
FIG. 4 is a circuit diagram showing a relay sequence of part of an elevator car operation controller CTL in FIG. 1 associated with the operation of the elevator car at a level correction speed.

FIG. 4 shows a relay sequence of part of the controller CTL shown in FIG. 1. In FIG. 4, the symbols $\oplus$ and $\ominus$ designate d-c power supply terminals. The symbols $C_1$ and $C_2$ designate a make contact and a break contact respectively of a door close signal relay C (not shown) for closing the door of the elevator car C. A level correction speed operation instruction relay S having a break contact $S_1$ and make contacts $S_2$, $S_3$ is energized to start the level correction speed levelling operation. When the door close signal relay C is energized to produce the door close instruction signal, a normal running speed opetation instruction relay H having make contacts $H_1$ and $H_2$ is energized by the circuit which is traced from the terminal $\oplus$ - relay contact $S_1$ - relay contact $C_1$ - relay H to the terminal $\ominus$. Thus, the level correction speed levelling operation does not take place when the elevator car door starts to close.

A normal running speed up travel signal relay UH (not shown) and a normal running speed down travel signal relay DH (not shown) have make contacts $UH_1$ and $DH_1$ respectively. The make contact $UH_1$ (or $DH_1$) of the relay UH (or DH) is turned on in response to the origination of a hall call or registration of a cage call, and the coil U (or D) of the up (or down) contactor is energized. Thus, the elevator car C starts to move in the up (or down) direction at the normal running speed.

Deenergization of the door close signal relay C results in deenergization of the normal running speed operation instruction relay H. The level correction speed operation instruction relay S is deenergized when both the contact $P_{A_1}$ of the upper position detecting element $P_A$ and the contact $P_{B_1}$ of the lower position detecting element $P_B$ are turned on. The relay S is energized when one of these contacts $P_{A_1}$ and $P_{B_1}$ is turned off. Further, in this latter case, the coil D (or U) of the down (or up) contactor is energized in response to the turn-off of the contact $P_{B_1}$ (or $P_{A_1}$) of the lower (or upper) position detecting element $P_B$ or $P_A$.

Figure 5A:
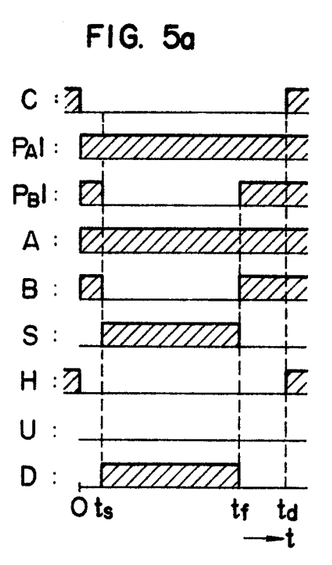
FIGS. 5a and 5b are time charts illustrating the operation of the relay sequence shown in FIG. 4.
Figure 5B:
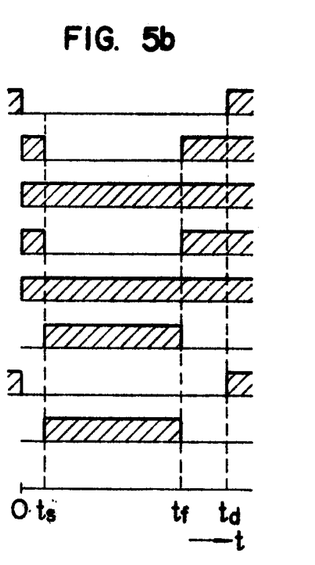

FIGS. 5a and 5b are time charts of the level correction speed levelling operation in the down direction and up direction respectively utilizing the relay sequence shown in FIG. 4. The turn-on and turn-off of the individual relay contacts are shown by the hatched and non-hatched portions respectively. Referring to FIGS. 5a and 5b, the elevator car door is opened at time $t = 0$, and the level correction speed levelling operation is started at time $t = t_s$ and completed at time $t = t_f$. The door is closed at time $t = t_d$.

Figure 6A:
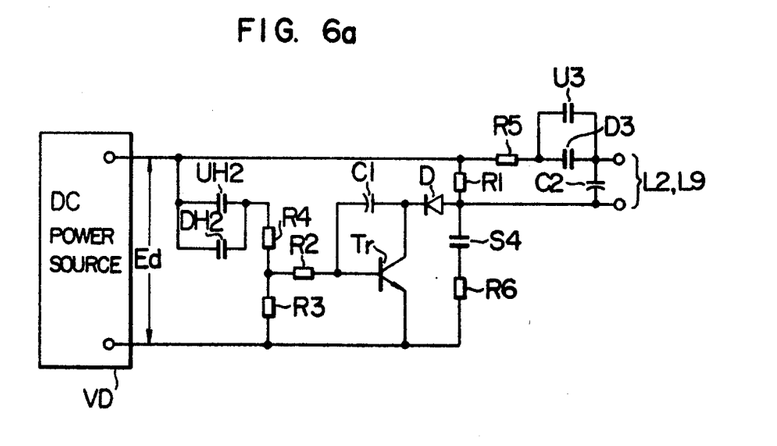
FIG. 6a is a practical circuit diagram showing the structure of one form of a speed pattern generator PTN in FIG. 1.

FIG. 6a is a circuit diagram showing the structure of one form of the speed pattern generator PTN consisting of the normal running speed pattern generating unit PTN$_R$ and the level correction speed pattern generating unit PTN$_C$.

Referring to FIG. 6a, a capacitor C$_1$ is charged by a power supply voltage Ed applied from a d-c power source VD through resistors R$_1$ to R$_3$ and a diode D when the elevator car C stands still with the door opened. Suppose now that a make contact UH$_2$ (or DH$_2$) of the normal running speed up (or down) travel signal relay UH (or DH) is turned on at time $t_A$ in FIG. 6b, the voltage obtained by dividing the power supply voltage Ed by the resistors R$_3$ and R$_4$ is applied to the base of a transistor Tr to start to turn on the same. As a result, the capacitor C$_1$ starts to discharge, and the voltage across the resistor R$_1$ starts to increase. At the time of complete discharge of the capacitor C$_1$, the voltage across the resistor R$_1$ is substantially equal to the power supply voltage Ed. An auxiliary make contact U$_3$ (or D$_3$) of the up (or down) contactor is turned on substantially simultaneously with the turn-on of the contact UH$_2$ (or DH$_2$) of the normal running speed up (or down) travel signal relay UH (or DH). Another capacitor C$_2$ is charged by the voltage across the resistor R$_1$ through another resistor R$_5$, and a normal running speed pattern signal as shown by the dotted line in FIG. 6b appears across the output terminals of the circuit to be applied to the phase shifter APS by way of the line L$_2$ in FIG. 1.

Figure 6B:
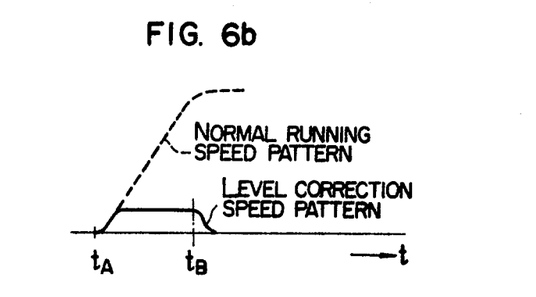

Then, when a make contact S$_4$ of the level correction speed operation instruction relay S is turned on at time $t_A$ in FIG. 6b, a voltage obtained by dividing the power supply voltage Ed by the resistor R$_1$ and another resistor R$_6$ is applied across the resistor R$_1$ in FIG. 6a. Since the auxiliary make contact U$_3$ (or D$_3$) of the up (or down) contactor is turned on substantially simultaneously with the turn-on of the contact S$_4$ of the level correction speed operation instruction relay S, the capacitor C$_2$ is charged with the voltage across the resistor R$_1$. The relay contact S$_4$ is turned off at time $t_B$, and the terminal voltage of the resistor R$_1$ is reduced to zero. Further, the auxiliary make contact U$_3$ (or D$_3$) of the up (or down) contactor is also turned off at time $t_B$, and the capacitor C$_2$ discharges to the imput side of the phase shifter APS. Therefore, a level correction speed pattern signal as shown by the solid line in FIG. 6b appears across the output terminals of the circuit to be applied to the phase shifter APS by way of the line L$_9$ in FIG. 1.

Figure 7:
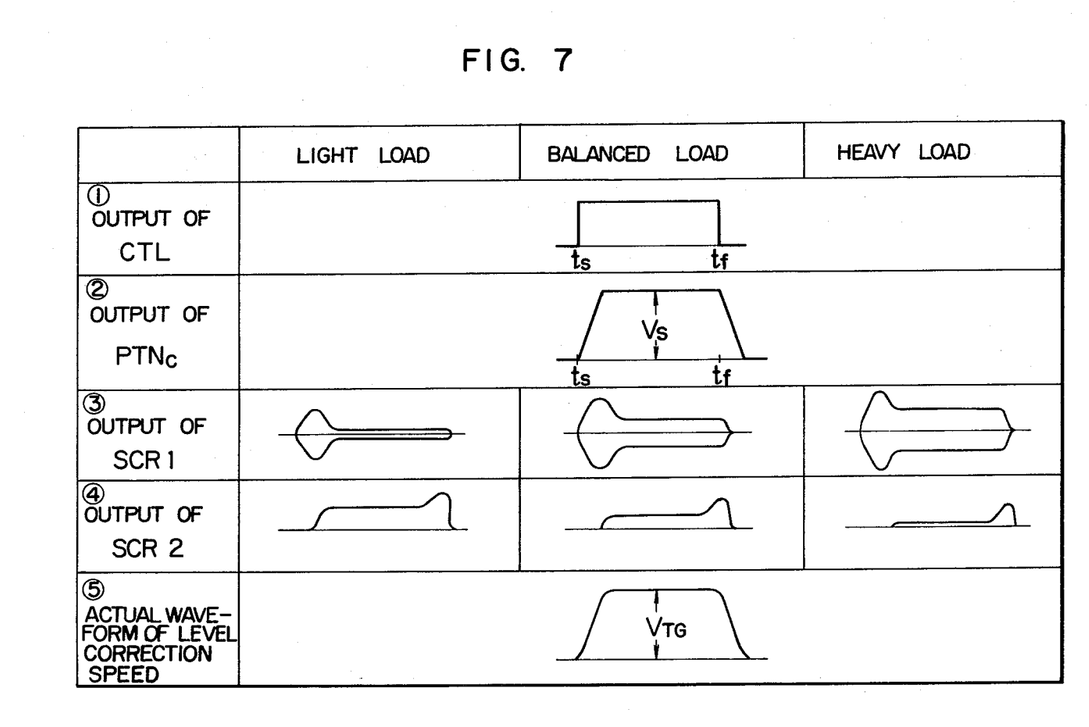
FIG. 7 shows various waveforms used for the control of the elevator car moving at a level correction speed.

FIG. 7 shows various waveforms used for the control of the level correction speed operation of the elevator car C. In ①of FIG. 7, the controller CTL delivers the level correction speed operation instruction signal having a waveform as shown. This output signal appears at time $t_s$ at which one of the position detecting elements P$_A$ and P$_B$ is turned off to start the level correction speed operation and disappears at time $t_f$ at which both these position detecting elements P$_A$ and P$_B$ are turned on to complete the level correction speed operation.

In ②of FIG. 7, the level correction speed pattern generating unit PTN$_C$ delivers the level correction speed pattern signal having a waveform as shown. This output signal appears at time $t_s$ and rises with a predetermined inclination to attain the level corresponding to the predetermined level correction speed setting V$_S$. At time $t_{f_1}$ this output signal starts to fall to disappear finally. The drive current supplied by one of the lines to the motor IM$_1$ from the first thyristor device SCR$_1$ has a waveform as shown in ③of FIG. 7. It will be seen that the motoring torque produced by the high-speed motor IM$_1$ is proportional to the second power of this current.

The waveform of the d-c braking current supplied to the maotor IM$_2$ from the second thyristor device SCR$_2$ is shown in ④of FIG. 7. It will be seen that the braking torque produced by the low-speed motor IM$_2$ is proportional to the second power of this current. The phase of these currents is controlled so that the relation $$\text{motoring torque} + \text{braking torque} + \text{load torque} = 0$$

can always hold under any load condition. The actual waveform of the level correction speed signal output V$_{TG}$ of the tachometer generator TG is shown in ⑤of FIG. 7. It will be seen that the predetermined level correction speed can be always obtained under any load condition so long as the individual torques satisfy the relation above specified.

It will be understood from the foregoing detailed description that the present invention provides an improved levelling apparatus for an a-c elevator in which existing means used for controlling the motoring torque and braking torque can be utilized for carrying out the desired reliable levelling operation.

Further, the provision of the level correction speed pattern signal generating unit and associated speed feedback control means in the embodiment of the present invention is advantageous in that improved levelling can be attained while ensuring a better feeling of comfortable ride and without being affected by the load condition. Furthermore, the present invention is advantageous in that it can be economically applied to an a-c elevator designed for effecting speed feedback control even during the normal running condition of the elevator car, since existing means can be fully utilized. The reliability of the levelling operation can be further improved when the level error detector is adapted to operate with a hysteresis characteristic. Moreover, the present invention is advantageous in that the gain of speed control can be inproved, and the elevator car can operate to follow accurately any variation in the speed pattern in the level correction speed range while ensuring a comfortable feeling of ride. Such advantage is obtained due to the fact that the motoring torque and braking torque are controlled to satisfy the relation described with reference to FIG. 7.

Figure 8:
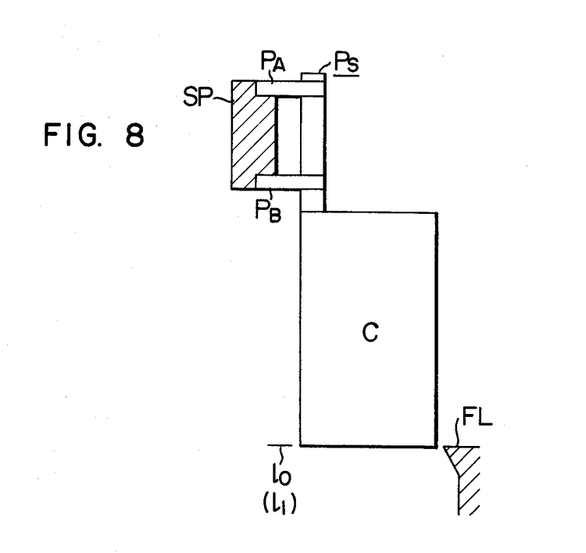
FIG. 8 shows a modification of the position detector.
Figure 9:
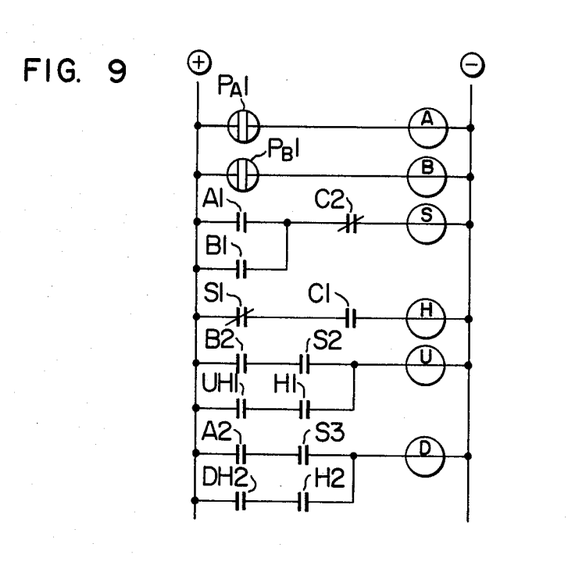
FIG. 9 is a circuit diagram showing a relay sequence used with the modification of the position detector shown in FIG. 8.

FIG. 8 shows a modification of the second position detecting unit P$_S$ shown in FIG. 2. In this modification, both the position detecting elements P$_A$ and P$_B$ are turned off when the elevator car C stops at the normal floor level, and when one of them is turned on, the level correction speed operation starting instruction signal appears from the controller CTL. FIG. 9 shows a relay sequence in this case. The relay sequence shown in FIG. 9 is basically the same as that shown in FIG. 4 except that break contacts of level correction speed up and down travel signal relays A and B in FIG. 4 are replaced by make contacts. It is needless to say that the position detecting elements P$_A$ and P$_B$ in FIG. 8 may be turned on in the illustrated position instead of being turned off.

What we claim is:

1. A levelling apparatus for an AC elevator system comprising a three-phase induction motor, motoring torque control means for controlling the motoring torque produced by said motor, braking torque control means for controlling the braking torque produced by said motor until a speed of said motor reaches a very low speed in the vicinity of zero, and an elevator car driven for vertical movement by said motor through a rope, wherein the improvement comprises level error detecting means for detecting dislocation of a floor level of said elevator car in either direction from the floor level of a target floor and means for controlling the torque produced by said motor by actuating said motoring torque control means and said braking torque control means in response to an output of said level error detecting means.

2. A levelling apparatus as claimed in claim 1, further comprising means for detecting the travelling speed of said elevator car, and wherein said torque control means comprises means for generating a level correction speed pattern signal in response to the appearance of the output from said level error detecting means, and means for actuating said motoring torque control means and said braking torque control means in accordance with the error between the output of said level correction speed pattern signal generating means and the output of said travelling speed detecting means.

3. A levelling apparatus as claimed in claim 2, wherein said level correction speed pattern signal has a magnitude independent of the magnitude of said level error.

4. A levelling apparatus as claimed in claim 2, wherein said level correction speed pattern signal has a predetermined magnitude independent of the magnitude of said level error.

5. A levelling apparatus as claimed in claim 2, wherein said torque control means allows said motor to generate said motoring torque and said braking torque simultaneously and controls the sum of said motoring torque and said braking torque when an error between said speed pattern signal and an output signal from said travelling speed detecting means is small.

6. A levelling apparatus as claimed in claim 2, wherein said torque control means actuates said motoring torque control means in response to the speed pattern signal level exceeding said travelling speed and actuates said braking torque control means in response to the travelling speed exceeding said speed pattern signal level.

7. A levelling apparatus as claimed in claim 1, wherein said braking torque control means comprises means for controlling a DC braking torque of said three-phase induction motor.

8. A levelling apparatus as claimed in claim 7, wherein said DC braking torque controlling means comprises a controllable rectifying circuit including thyristors and is connected between a three-phase AC power source and said three-phase induction motor.

9. A levelling apparatus as claimed in claim 7, wherein said braking torque control means comprises means for controlling the negative-phase braking torque of said three-phase induction motor.

10. A levelling apparatus as claimed in claim 7, wherein said level error detecting means is constructed to exhibit such a hysteresis characteristic that an output appears therefrom when the floor level of said elevator car is spaced apart from the floor level of said floor by a predetermined distance, and said output continues to appear until the spacing therebetween is reduced to less than said predetermined distance.

11. A levelling apparatus as claimed in claim 7, wherein said motoring torque control means comprises a pair of thyristors connected in inverse-parallel connection to at least one of the power supply lines connected between a three-phase AC power source and said induction motor.

12. A levelling apparatus as claimed in claim 7, wherein said motoring torque control means comprises a parallel circuit of thyristors and diodes which is connected to at least one of the power supply lines connected between a three-phase AC power source and said induction motor.

13. A levelling apparatus as claimed in claim 1, wherein said induction motor comprises first and second induction motors having different numbers of poles, and said motoring torque control means is operatively associated with said first induction motor having a smaller number of poles, while said braking torque control means is operatively associated with said second induction motor having a larger number of poles.

14. A levelling apparatus as claimed in claim 1, wherein said motor comprises a pair of stator windings each having a different number of poles, and a single rotor, and said motoring torque control means is operatively associated with one of said stator windings having a smaller number of poles, and said braking torque control means is operatively associated with the other one of said stator windings having a larger number of poles.

15. A levelling apparatus as claimed in claim 1, wherein said torque control means is adapted to operate only when a door of said elevator car is kept open at said floor.

16. A levelling apparatus for an AC elevator system comprising a three-phase induction motor, motoring torque control means for controlling the motoring torque produced by said motor, braking torque control means for controlling the braking torque produced by said motor until the speed of said motor reaches a very low speed in the vicinity of zero, an elevator car driven for vertical movement by said motor through a rope, means for generating a normal running speed pattern signal for causing normal service travelling movement of said elevator car, means for generating a speed signal representing the travelling speed of said elevator car, and means for actuating said motoring torque control means and said braking torque cntrol means in response to the error between the output of said normal running speed pattern signal generating means and the output of said travelling speed signal generating means thereby controlling the travelling speed of said elevator car, wherein the improvement comprises level error detecting means for detecting dislocation of the floor level of said elevator car in either direction from the floor level of a target floor, means for generating a level correction speed pattern signal in response to the appearance of an output from said level error detecting means, and means for changing said level correction speed pattern signal over to said travelling speed control means in lieu of said normal running speed pattern signal.

17. A levelling apparatus as claimed in claim 16, wherein said change-over means applies said normal running speed pattern signal to said travelling speed control means only when the door of said elevator car is kept closed, and applies said level correction speed pattern signal to said travelling speed control means only when the door of said elevator car is kept open at said floor.

18. A levelling apparatus as claimed in claim 16, wherein said normal running speed pattern signal generating means and said level correction speed pattern signal generating means include a common electrical means for selectively generating the one of said normal running speed pattern signal and said level correction speed pattern signal which is selected by said change-over means.

19. A levelling apparatus as claimed in claim 16, wherein said level correction speed pattern signal has a magnitude independent of the magnitude of said level error.

20. A levelling apparatus as claimed in claim 16, wherein said level correction speed pattern signal has a predetermined magnitude independent of the magnitude of said level error.

21. A levelling apparatus as claimed in claim 16, wherein said torque control means allows said motor to generate said motoring torque and said braking torque simultaneously and controls the sum of said motoring torque and said braking torque when an error between a speed pattern signal and said speed signal from the speed signal generating means is small.

22. A levelling apparatus as claimed in claim 16, wherein said torque control means actuates said motoring torque control means in response to the speed pattern signal level exceeding said travelling speed and actuates said braking torque control means in response to the travelling speed exceeding said speed pattern signal level.

23. A levelling apparatus as claimed in claim 16, wherein said braking torque control means comprises means for controlling a DC braking torque of said three-phase induction motor.

24. A levelling apparatus as claimed in claim 23, wherein said DC braking torque controlling means comprises a controllable rectifying circuit including thyristors and is connected between a three-phase AC power source and said three-phase induction motor.

25. A levelling apparatus as claimed in claim 16, wherein said braking torque control means comprises means for controlling the negative-phase braking torque of said three-phase induction motor.

26. A levelling apparatus as claimed in claim 16, wherein said level error detecting means is constructed to exhibit such a hysteresis characteristic that an output appears therefrom when the floor level of said elevator car is spaced apart from the floor level of said floor by a predetermined distance, and said output continues to appear until the spacing therebetween is reduced to less than said predetermined distance.

27. A levelling apparatus as claimed in claim 16, wherein said motoring torque control means comprises a pair of thyristors connected in inverse-parallel connection to at least one of the power supply lines connected between a three-phase AC power source and said induction motor.

28. A levelling apparatus as claimed in claim 16, wherein said motoring torque control means comprises a parallel circuit of thyristors and diodes which is connected to at least one of the power supply lines connected between a three-phase AC power source and said induction motor.

29. A levelling apparatus as claimed in claim 16, wherein said induction motor comprises a first and a second induction motor having different numbers of poles, and said motoring torque control means is associated with said first induction motor having a smaller number of poles, while said braking torque control means is associated with said second induction motor having a larger number of poles.

30. A levelling apparatus as claimed in claim 16, wherein said motor comprises a pair of stator windings each having a different number of poles, and a single rotor, and said motoring torque control means is associated with one of said stator windings havin a smaller number of poles, and said braking torque control means is associated with the other one of said stator windings having a larger number of poles.

31. A levelling apparatus as claimed in claim 18, wherein said change-over means is adapted to change a maximum value of said speed pattern signal.

32. A levelling apparatus as claimed in claim 18, wherein said common electrical means comprises means for generating a speed pattern signal increasing in accordance with lapse of time.

33. A levelling apparatus as claimed in claim 18, wherein said common electrical means comprises means for generating a speed pattern signal increasing in accordance with lapse of time, and said change-over means is adapted to change a maximum value of said speed pattern signal.

* * * * *